United States Patent
Link, II et al.

(10) Patent No.: US 6,526,273 B1
(45) Date of Patent: Feb. 25, 2003

(54) SYSTEM AND METHOD FOR AUTOMATED PRE-PAID WIRELESS REPLENISHMENT WITH NOTIFICATION

(75) Inventors: Charles M. Link, II, Roswell, GA (US); Vernon Meadows, Lilburn, GA (US); Mark Feidler, Atlanta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/468,886

(22) Filed: Dec. 22, 1999

(51) Int. Cl.[7] .............................................. H04M 11/00
(52) U.S. Cl. ..................... 455/406; 455/408; 455/466; 379/114.16; 379/114.17
(58) Field of Search ................................ 455/406, 407, 455/408, 466; 379/114.01–115.01, 133–134, 144.01, 114.15–114.2

(56) References Cited

U.S. PATENT DOCUMENTS

| | | | | |
|---|---|---|---|---|
| 5,588,042 A | | 12/1996 | Comer | |
| 5,719,926 A | * | 2/1998 | Hill | 379/113 |
| 5,825,863 A | * | 10/1998 | Walker | 379/144 |
| 6,029,062 A | * | 2/2000 | Hanson | 455/408 |
| 6,070,067 A | * | 5/2000 | Nguyen et al. | 455/407 |
| 6,188,752 B1 | * | 2/2001 | Lesley | 379/114 |
| 6,226,364 B1 | * | 5/2001 | O'Neil | 379/112 |

* cited by examiner

Primary Examiner—Thanh Cong Le
Assistant Examiner—Tuan Tran
(74) Attorney, Agent, or Firm—Shaw Pittman LLP

(57) ABSTRACT

A system and method for providing pre-paid wireless telephone customers notification that a wireless telephone account has been replenished. The present invention delivers a confirmation notice directly to a pre-paid wireless telephone customer through the customer's wireless telephone. The notification system receives account replenishment information from a replenishment system and updates its database to indicate a notice must be sent. Because the wireless telephone may or may not be available when the notification system is ready to send the confirmation notice, the system intercepts registration messages sent by the wireless telephone, thereby allowing the notification system to detect when the wireless telephone is available.

16 Claims, 3 Drawing Sheets

SYSTEM AND METHOD FOR AUTOMATED PRE-PAID WIRELESS REPLENISHMENT WITH NOTIFICATION

BACKGROUND

1. Field of the Invention

The present invention relates generally to wireless telecommunications systems. More particularly, the present invention relates to wireless telephone services offered on a pre-paid basis.

2. Background of the Invention

Wireless telephone services have become quite commonplace in modern society. However, such services have not reached their full potential in terms of customer base because certain segments of the population have been precluded from acquiring wireless service. Wireless service providers often require new customers to prove they have an acceptable credit rating. Additionally, typical wireless service providers require the customer to sign a contract governing the billing and collection procedures for services used. Often times wireless service providers further require the customer to hold a credit card or other bank-approved credit that may be used in the event of non-payment by the customer. Such requirements may not be possible or desirable for all potential customers. For example, a young customer may not have an established credit rating, or a customer may have had past credit problems but can now afford and desires a wireless telephone. Alternatively, a customer may not wish to sign a contract, or may prefer a cash-based transaction over a credit-based one. With the Telecommunications Act of 1996, the scope of the well-known concept of "universal service" now likely includes even homeless people. Although a wireless telephone might be well suited for such customers, they may not have a mailing address or the requisite established "financial identity" generally needed to acquire a wireless telephone.

To fill this need, the wireless industry has developed a pre-paid wireless service in which the customer pre-pays for the services required before they are used. Generally, when a pre-pay customer purchases a wireless telephone, a pre-determined usage level is also purchased. The level determines how much wireless telephone service has been purchased and can be measured, e.g., in terms of minutes remaining or in terms of dollars paid. The wireless service provider may further limit calls to local non-toll calls, or may limit the roaming capabilities of the wireless telephone depending on the usage level purchased. As the wireless telephone is used, the usage level is metered and reduced according to the time or dollars consumed. Wireless telephone service providers typically allow the customer to "re-charge" or replenish the usage level as necessary when the balance is low.

Several pre-payment models have evolved to allow customers to replenish the usage levels in their wireless service accounts. In one model, retail stores sell specially encoded cards to pre-paid wireless customers. The customer then locates a telephone and calls the wireless service provider. The service provider prompts the customer for the account information associated with the wireless telephone and the special code on the card purchased from the retailer. Using this information, the wireless provider increases the customer's usage level according to the value of the purchased card. In a related model, the customer still visits a retail store to purchase the additional usage level. However, this model includes point-of-sale processing wherein the retailer both sells the encoded card and processes the wireless customer's purchase with the wireless service provider. The cashier or some other service representative of the retailer contacts the wireless service provider with verification of payment from the wireless customer.

In yet another pre-payment model, the retailer uses a card-swipe machine similar to those now prevalent in a variety of retail sales stores, such as a grocery store. Such machines read a magnetic strip on the encoded card and the customer is prompted for the wireless telephone identification. Once the card is read, its value is erased and the wireless telephone is replenished. This model has an advantage over the first two models described above in that the retailer's involvement is minimal.

A final model for replenishing wireless telephones involves the use of automatic teller machines ("ATMs"). In this model, the customer inserts cash into the ATM and is prompted for the wireless telephone identification. In cases where the ATM is equipped with a currency reader, the ATM verifies the amount of money inserted and replenishes the wireless telephone immediately. This model would be ideal in that human interaction is limited and the response from the wireless service provider is provided directly to the customer via the ATM. Unfortunately, the majority of ATMs in use today are not equipped with currency readers. More commonly, ATMs require the customer to place cash into an envelope which is then fed into the machine. The wireless telephone is not replenished until a technician services the machine and verifies the amount of cash in each envelope.

With the exception of ATMs having currency readers, all of the above methods for replenishing pre-paid wireless telephones have problems making them less than desirable for wireless customers and wireless service providers. The primary problem is the lack of affirmative confirmation to the customer that the telephone usage level has been replenished. Under the methods discussed above, a customer pays out the money, usually cash, then must wait for the telephone to be replenished by the wireless service provider. In some cases, the customer can call into the service provider to get a reading of the account balance, but otherwise, there is no notice. It is important to note that pre-paid wireless customers do not receive any monthly statements from wireless service providers. Wireless customers are essentially anonymous users from the wireless service provider's perspective. The wireless service provider may not even have a valid name or address associated with the wireless telephone. Thus, if any mistakes are made when a wireless customer attempts to replenish the wireless telephone, there may be no way to quickly identify and correct the error. A further problem with such conventional methods is that in many cases, pre-paid customers may not trust large financial institutions and may therefore be reluctant to insert cash without a more rapid confirmation of receipt.

Thus, a need exists for an automated system for providing confirmation to wireless telephone customers when the wireless telephone has been replenished. To be effective, such a notification system must be able to send the notification directly to the customer's wireless telephone handset.

SUMMARY OF THE INVENTION

The present invention provides a system for notifying wireless telephone customers when their wireless telephones have been replenished. The system comprises a means for detecting when a wireless telephone has been replenished and is in need of a confirmation message. The system further comprises a means for detecting when the wireless telephone is available to receive the confirmation message. In one embodiment, the present invention further comprises a reverse interactive voice recorder ("IVR"). The reverse IVR initiates a telephone call to the wireless telephone and plays a digitally synthesized voice message conveying the account information when the call is answered. Unlike typical telephone calls to or from a wireless telephone, the airtime used for the reverse IVR's call is not billed to the customer's account. In another embodiment, the present invention uses a short message service ("SMS") to deliver a text message to the wireless handset. The SMS delivery is the preferred embodiment when the wireless telephone is capable of digital signaling. On the other hand, when the wireless telephone is limited to analog signaling, delivery via reverse IVR is preferred.

It is an object of the present invention to provide notice directly to a wireless telephone customer when the wireless telephone account has been replenished.

It is a further object of the present invention to provide notice of replenishment to a wireless customer as soon as the wireless telephone is available to receive a telephone call or text message.

It is a further object of the present invention to instill greater trust in the replenishment systems used by wireless service providers for wireless telephones by providing pre-paid wireless customers with more rapid notice of successful account replenishment.

These and other objects of the present invention are described in greater detail in the detailed description of the invention, the appended drawings and the attached claims.

DETAILED DESCRIPTION OF THE INVENTION

Figure 1:
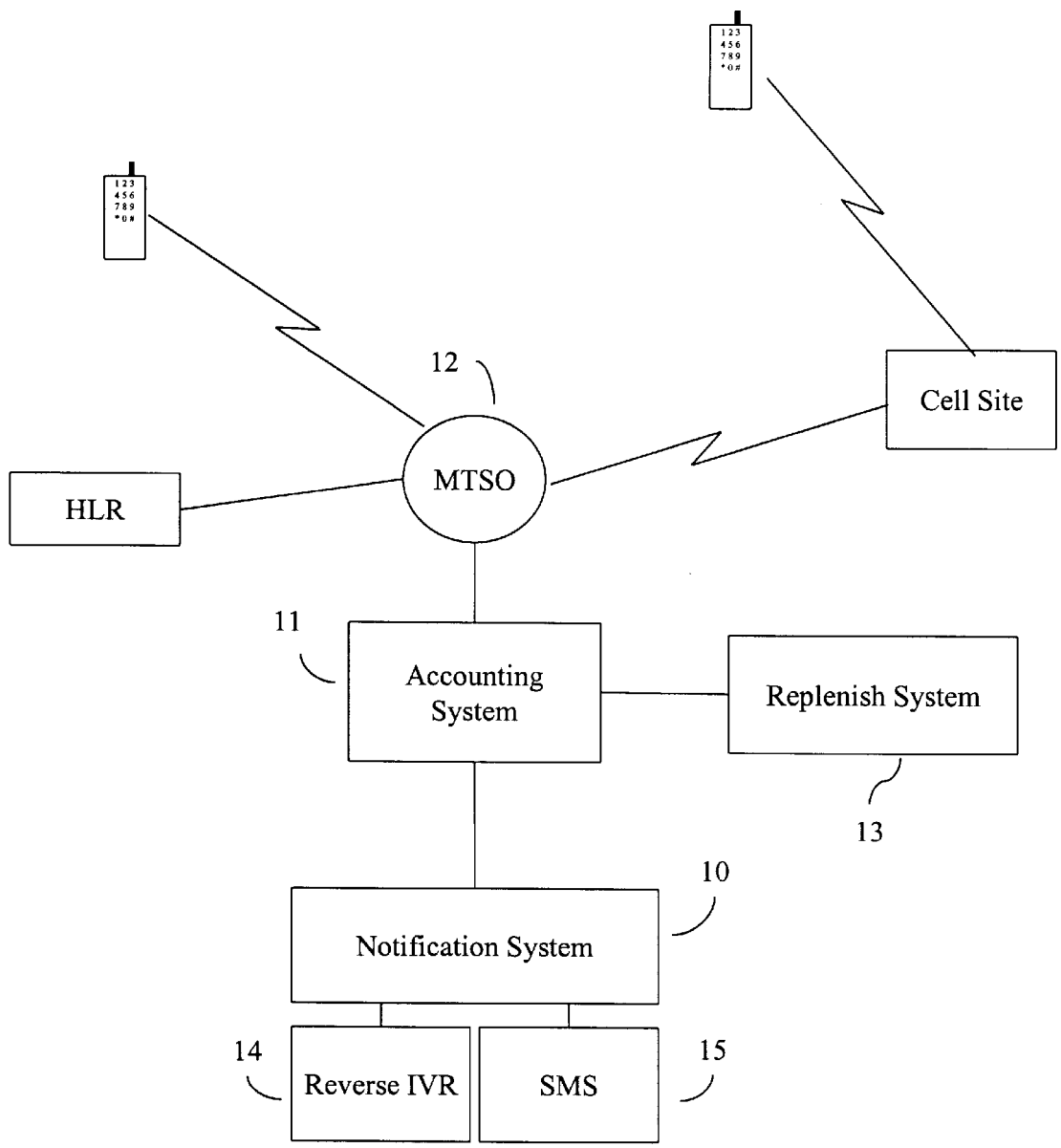
FIG. 1 is a schematic diagram showing the notification system of the present invention integrated into a cellular mobile radiotelephone communications system.

The present invention incorporates a new notification system 10 into existing cellular mobile radiotelephone ("CMR") communications systems. As shown in FIG. 1, notification system 10 is functionally connected to accounting system 11. As is known in the art, accounting system 11 may use one of many methods for tracking the usage balance for each pre-paid wireless telephone it serves. Two of the more commonly used accounting methods are the "hair-pin" system and the newer wireless intelligent network ("WIN") triggers. The hair-pin method includes an accounting device (not shown) that intercepts calls serviced by mobile telephone switching office ("MTSO") 12 to monitor and track the usage for each call to or from a pre-paid wireless telephone. In the WIN trigger method, accounting system 11 communicates directly with MTSO 12 which monitors and tracks the usage levels. In either case, accounting system 11 is the master database for tracking usage levels available for each pre-paid wireless telephone. Before any calls to or from a pre-paid wireless telephone are allowed by MTSO 12, accounting system 11 must first verify the usage level available for the account.

When a pre-paid wireless customer replenishes a pre-paid wireless telephone using replenishment system 13 a database in accounting system 11 is updated with the new account information. Replenishment system 13 may incorporate any of the means described above, or any other means for collecting funds to apply to the prepaid wireless telephone account. As would be apparent to one skilled in the art, how accounting system 11 receives the update is not material to the present invention. Upon receipt of the account update, accounting system 11 sends a data message to notification system 10. The data message includes information such as the account identification, the previous usage balance, and the new usage balance. In a preferred embodiment, the account identification is the mobile identification number ("MIN"), i.e., the telephone number, associated with the pre-paid wireless telephone.

Notification system 10 comprises a database for tracking which pre-paid wireless telephones have recently been replenished and are in need of a notification message. The system further comprises a means for delivering a confirmation notice to the pre-paid wireless customer's telephone. The delivery means comprises reverse IVR 14 and/or SMS 15. As noted above, reverse IVR 14 initiates a telephone call to the wireless telephone and plays a digitally synthesized voice message conveying the wireless telephone's previous usage balance and the new usage balance when the call is answered. In an alternate embodiment, the reverse IVR's voice message includes additional information such as who to contact if the customer suspects an error in the usage balances provided. Reverse IVR 14 communicates with accounting system 11 to ensure that any telephone calls it places are not billed to the customer's account. Reverse IVR 14 is the preferred delivery means when the wireless telephone is only capable of analog signaling.

SMS 15 uses well-known short messaging protocols to deliver a text message to the wireless telephone handset. The text message includes the same information as is provided with the reverse IVR 14. SMS 15 is the preferred delivery means when the wireless telephone is capable of digital signaling. This is true because transmission of short text messages is more cost effective than transmission of voice messages. Moreover, the pre-paid customer need not be disturbed with a telephone call. Instead, the text message may be stored in the customer's wireless telephone handset for retrieval at the customer's convenience. Of course, if the wireless customer has a voicemail service for the wireless telephone then telephone calls via reverse IRV 13 could be stored for later retrieval by the customer as well.

The final component of the notification system of the present invention is the means for detecting when a pre-paid wireless telephone is available to receive the notification messages of the present invention. This is accomplished by intercepting registration messages which are commonly sent by wireless telephones to aid in identifying the proper cell site to handle wireless calls. As is well known in the art, such registration messages generally include the wireless telephone's MIN and the unit's station class mark ("SCM"), which is used to identify the functional characteristics of the wireless telephone handset. Other information may optionally be included as specified by the wireless telephone service provider. By intercepting the registration messages, notification system 10 determines when a pre-paid wireless telephone is available to receive notification.

Figure 2:
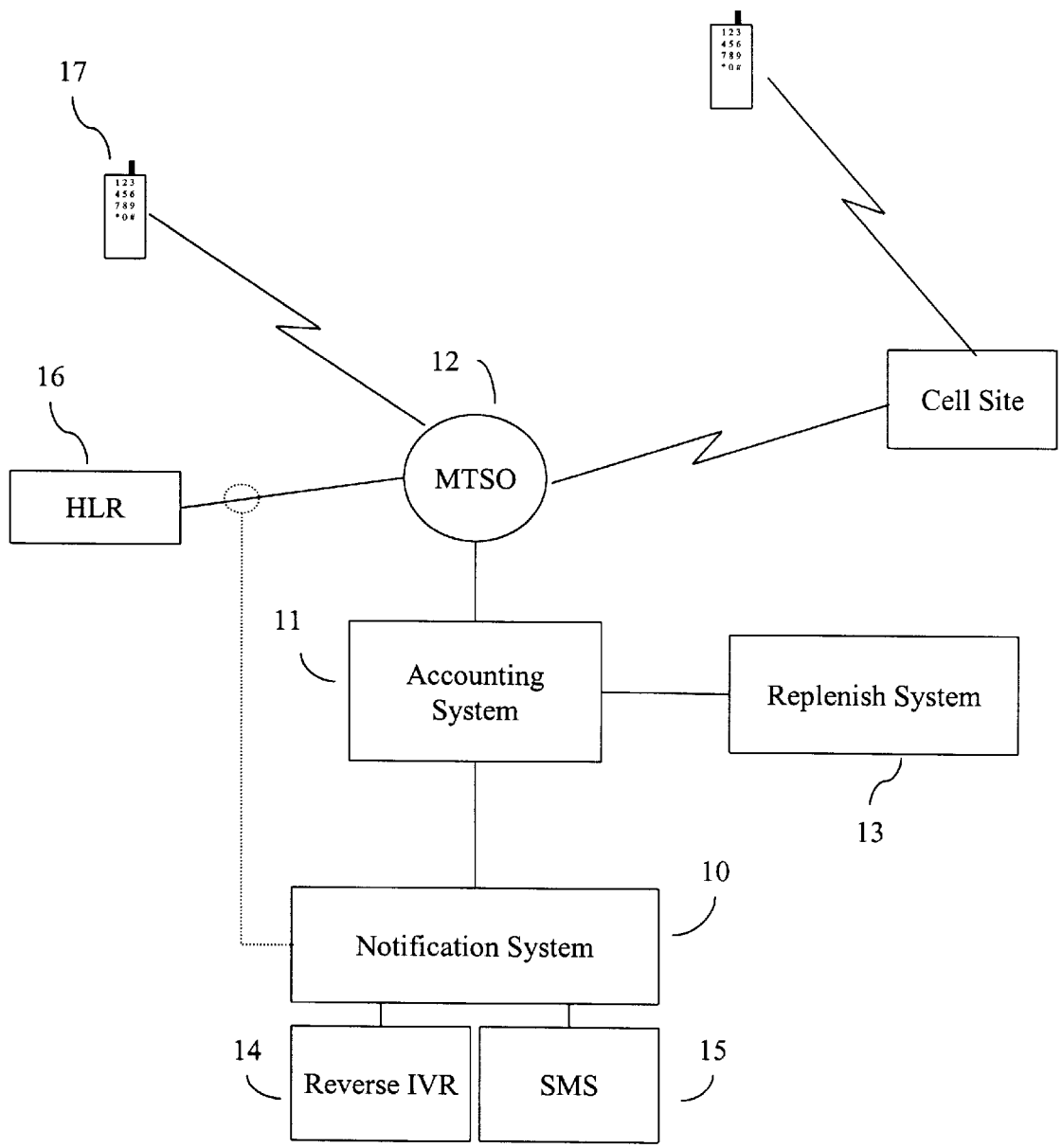
FIG. 2 is a schematic diagram of an embodiment of the present invention showing the preferred point for monitoring registration message traffic.

FIG. 2 is a schematic diagram of a system for intercepting registration messages. As shown in FIG. 2, the registration messages are intercepted prior to arrival at home location register ("HLR") 16. As is known in the art, MTSO 12 forwards all registration messages to the HLR servicing the wireless telephone. For example, if wireless telephone 17 is "homed" on HLR 16, then registration messages are sent to HLR 16 regardless of where wireless telephone 17 is physically located. HLR 16 is the only HLR capable of validating wireless telephone 17. Thus, by monitoring the registration message traffic at the point depicted in FIG. 2, notification system 10 will only intercept registration messages destined for HLR 16.

Figure 3:
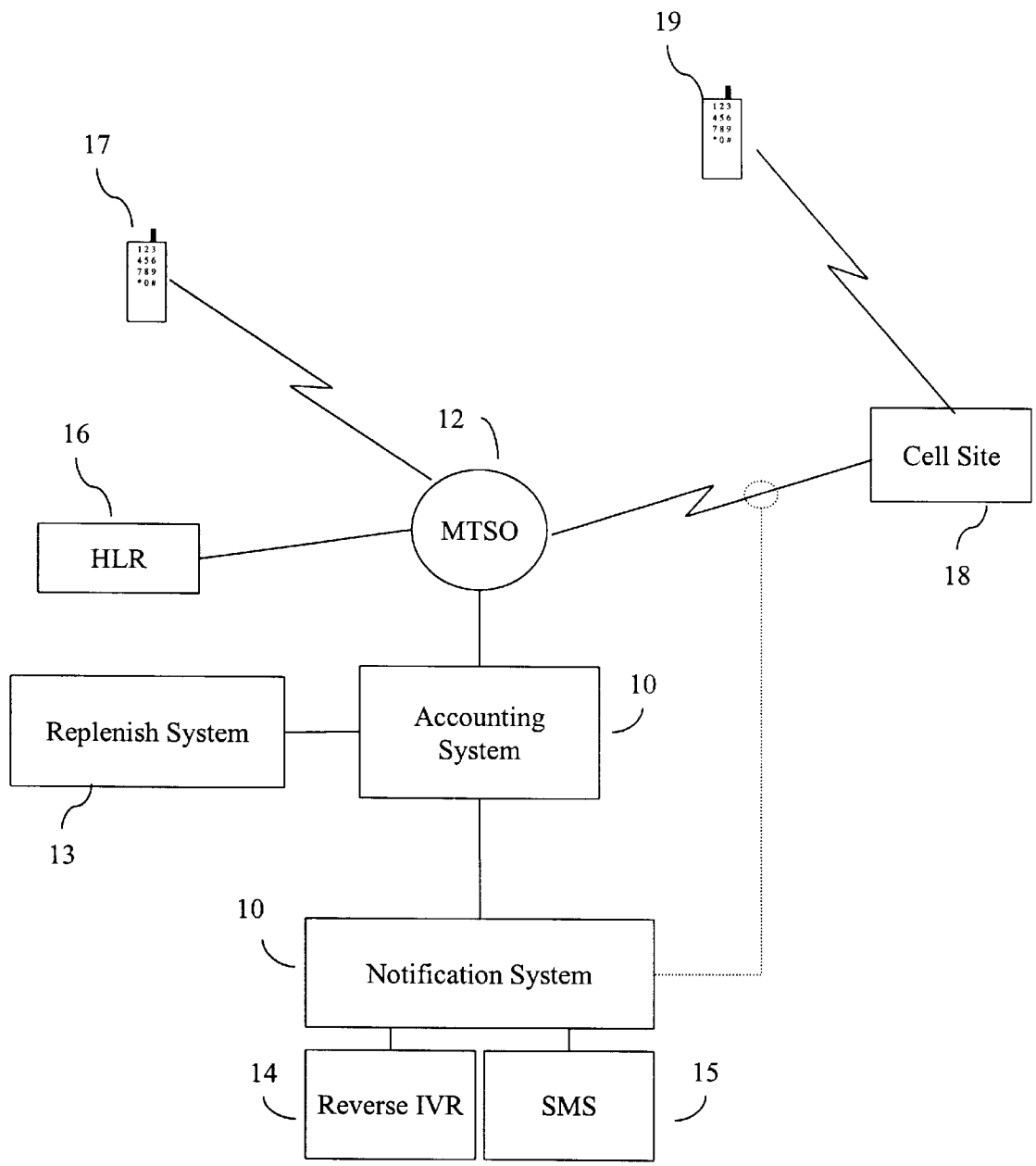
FIG. 3 is a schematic diagram of an embodiment of the present invention showing an alternative point for monitoring registration message traffic.

FIG. 3 shows an alternate system for intercepting registration messages. This system monitors registration messages sent between cell site 18 and MTSO 12 as disclosed in U.S. Pat. No. 5,588,042, which is incorporated by reference herein in its entirety. Whenever a wireless telephone is powered on, or whenever a powered wireless telephone enters a different cell site, the telephone sends its registration message through the cell site. For example, if wireless telephone 19, already powered on, is in a car travelling through cell site 18, the registration message is transmitted through cell site 18 to MTSO 12. By monitoring all registration message traffic between cell sites and MTSOs, notification system 10 can detect when a wireless telephone is available to receive the replenishment confirmation message.

Notification system 10 compares the registration information gathered by the detection system with the information in its database. Notification system 10 determines whether an entry exists in the database indicating that the wireless telephone has been recently replenished but has not yet received a confirmation message. If a confirmation message is required, notification system 10 issues the message through either reverse IVR 14 or SMS 15, as described above. After sending the confirmation notice, notification system 10 removes the entry associated with the wireless telephone in the database so that multiple confirmation messages are not sent.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What we claim is:

1. A system for providing a confirmation notice to a pre-paid wireless telephone comprising:
   (a) a means for detecting when a wireless telephone has been replenished;
   (b) a means for detecting when the wireless telephone is available to receive the confirmation notice;
   (c) a database comprising records of wireless telephones in need of a confirmation notice; and
   (d) a means for delivering the confirmation notice to the wireless telephone.

2. The system of claim 1, wherein the means for detecting when a wireless telephone has been replenished comprises a means for intercepting a registration message transmitted by the wireless telephone.

3. The system of claim 2, wherein the means for intercepting a registration message comprises monitoring a plurality of message traffic at a point directly between a mobile telephone switching office and a home registration locator.

4. The system of claim 2, wherein the means for intercepting a registration message comprises monitoring a plurality of message traffic at a point between a cell site and a mobile telephone switching office.

5. The system of claim 1, wherein the means for delivering the confirmation notice comprises a reverse interactive voice recorder, wherein said reverse interactive voice recorder initiates a telephone call to the wireless telephone and plays a confirmation announcement.

6. The system of claim 5, wherein the confirmation announcement comprises a digitally synthesized voice message indicating a prior pre-paid account balance and a current pre-paid account balance.

7. The system of claim 1, wherein the means for delivering the confirmation notice comprises a short message service system, wherein said short message service system sends a text message to the wireless telephone.

8. The system of claim 7, wherein the text message comprises a prior pre-paid account balance and a current pre-paid account balance.

9. A method for providing a confirmation notice to a pre-paid wireless telephone comprising the steps of:
   (a) detecting when a wireless telephone has been replenished;
   (b) detecting when the wireless telephone is available to receive the confirmation message;
   (c) establishing a database comprising records of wireless telephones in need of a confirmation notice; and
   (d) delivering the confirmation notice to the wireless telephone.

10. The method of claim 9, wherein step (b) comprises the step of intercepting a registration message transmitted by the wireless telephone.

11. The method of claim 10, wherein the step of intercepting a registration message comprises monitoring a plurality of message traffic at a point directly between a mobile telephone switching office and a home registration locator.

12. The method of claim 10, wherein the step of intercepting a registration message comprises monitoring a plurality of message traffic at a point between a cell site and a mobile telephone switching office.

13. The method of claim 9, wherein step (c) comprises the steps of initiating a telephone call from a reverse interactive voice recorder to the wireless telephone and playing a confirmation announcement.

14. The method of claim 13, wherein the confirmation announcement comprises a digitally synthesized voice message indicating a prior pre-paid account balance and a current pre-paid account balance.

15. The method of claim 9, wherein step (c) comprises the step of sending a text message from a short message service system.

16. The method of claim 15, wherein the text message comprises a prior pre-paid account balance and a current pre-paid account balance.

* * * * *

UNITED STATES PATENT AND TRADEMARK OFFICE
CERTIFICATE OF CORRECTION

| | | |
|---|---|---|
| PATENT NO. | : 6,526,273 B1 | Page 1 of 1 |
| APPLICATION NO. | : 09/468886 | |
| DATED | : February 25, 2003 | |
| INVENTOR(S) | : Charles M. Link, II et al. | |

It is certified that error appears in the above-identified patent and that said Letters Patent is hereby corrected as shown below:

<u>IN THE DRAWINGS</u>: In FIG. 3, delete "10" and insert therefor --11--.

<u>Column 4,</u>
Line 47, after "reserve", delete "IRV" and insert therefor --IVR--.

Signed and Sealed this

Twentieth Day of March, 2007

JON W. DUDAS
*Director of the United States Patent and Trademark Office*